April 7, 1953  E. T. YOUNG  2,633,645
WELL SURVEYING INSTRUMENT
Filed July 1, 1949  2 SHEETS—SHEET 1
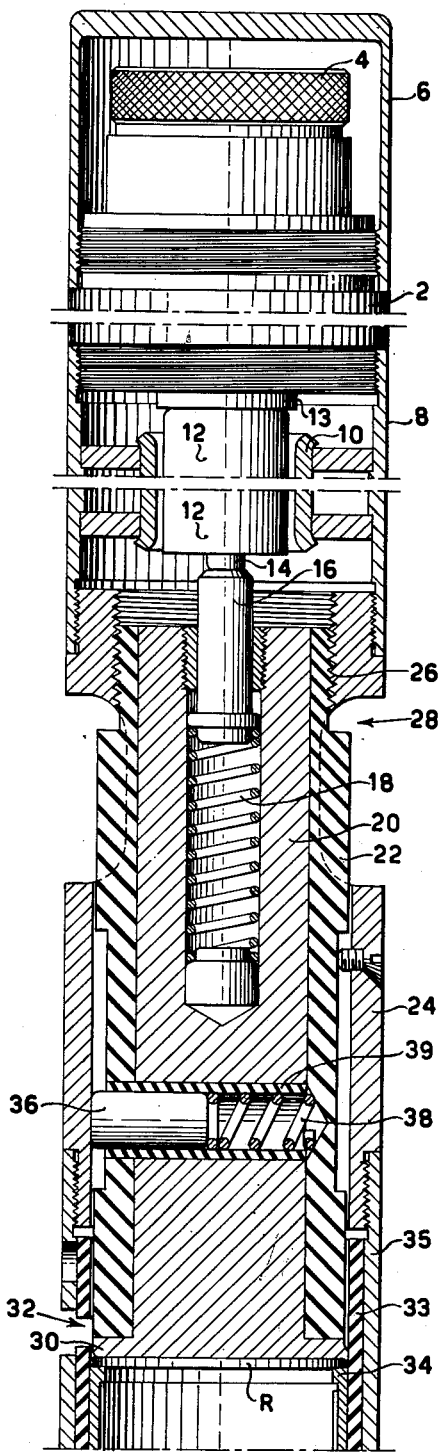
FIG. IA.
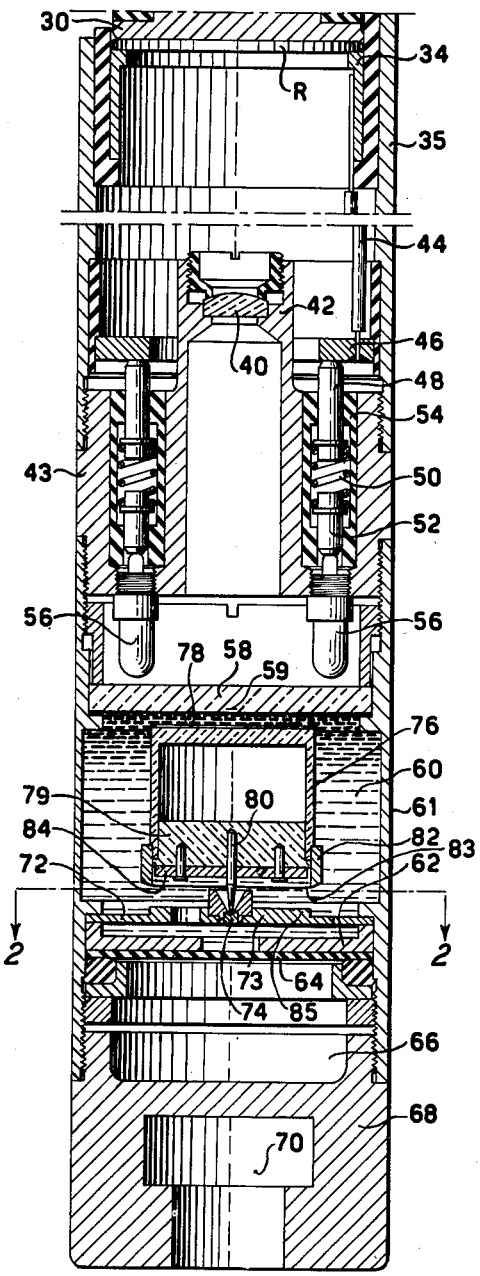
FIG. IB.
INVENTOR.
EINAR T. YOUNG
BY
*Busker + Harding*
ATTORNEYS.

April 7, 1953  E. T. YOUNG  2,633,645
WELL SURVEYING INSTRUMENT
Filed July 1, 1949  2 SHEETS—SHEET 2
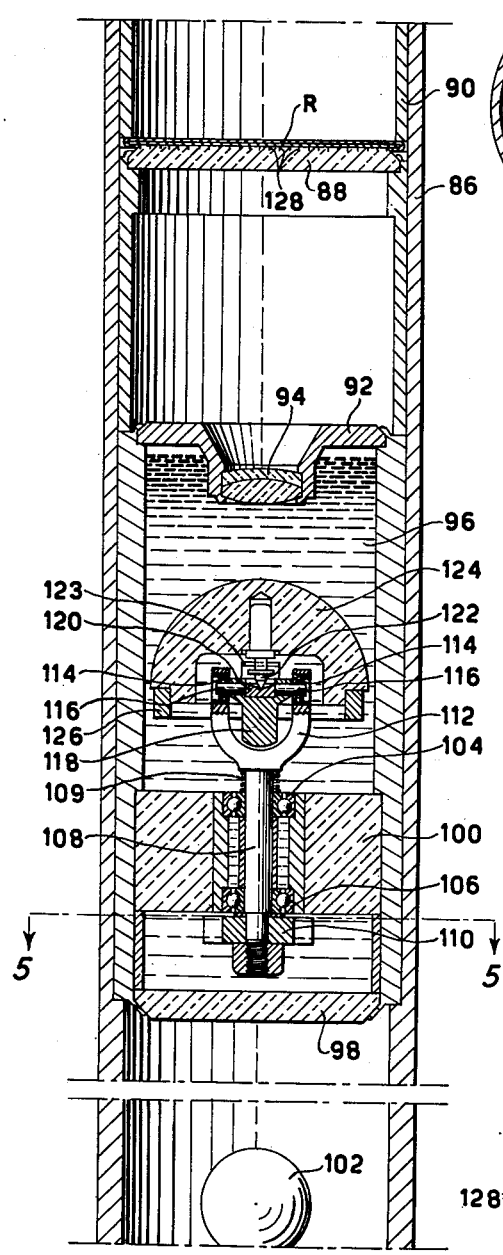
FIG. 4.
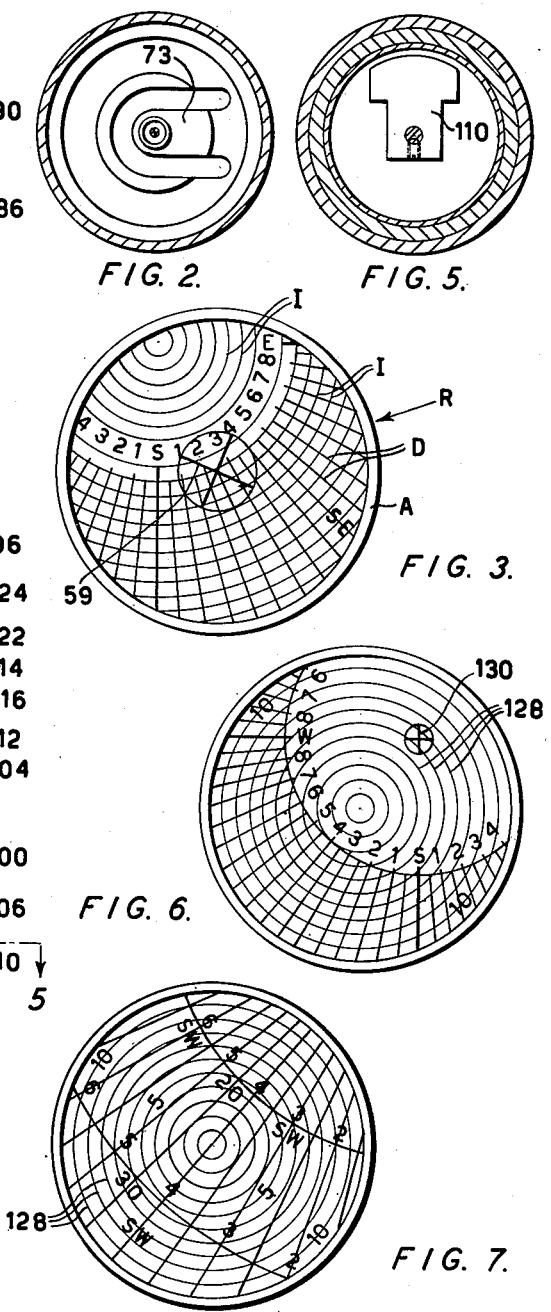
FIG. 2.  FIG. 5.
FIG. 3.
FIG. 6.
FIG. 7.
INVENTOR.
EINAR T. YOUNG
BY
ATTORNEYS.

Patented Apr. 7, 1953

2,633,645

UNITED STATES PATENT OFFICE 2,633,645

WELL SURVEYING INSTRUMENT

Einar T. Young, Ridley Park, Pa., assignor to Sperry-Sun Well Surveying Company, Philadelphia, Pa., a corporation of Delaware Application July 1, 1949, Serial No. 102,474

3 Claims. (Cl. 33—205.5)

This invention relates to a well surveying instrument and particularly to a well surveying instrument of photographic, magnetic type.

Well surveying instruments in use at the present time, when intended to give records of both inclination and azimuthal direction of inclination, are generally photographic and involve separate sensitive elements for indicating the inclination and azimuth. Such instruments may be either single shot or multiple shot depending upon whether one or a plurality of records is to be made in a single run in a well. As will be evident hereafter, the present invention is applicable to either type of instrument, though a single shot type is specifically disclosed.

Difficulties have been encountered in the above mentioned types of well surveying instruments in that mountings, particularly of compass elements, involve frictional restraints on motion which are sufficient to resist the small magnetic moments which serve to turn the compass elements and hence inaccuracy of azimuthal readings may occur. While highly sensitive compass mountings are available for other uses well surveying instruments require rugged mountings in view of the shocks to which the instruments are subjected in passing through bore holes and in handling at the surface. It has been difficult to achieve sufficiently frictionless mountings consistent with requirements of ruggedness.

Furthermore, in most successful instruments it has been necessary to provide separate elements for indicating direction and inclination with consequent difficulties in maintaining completely accurate alignment of the various elements to secure thoroughly reliable results.

In accordance with the present invention a single indicating element is involved for indications of both inclination and the azimuth of the inclination. The mounting of this combination element is such as to give rise to extreme sensitivity but, nevertheless, a high degree of resistance to shocks and wear. This is achieved by mounting the indicating element through a point resting in a jeweled socket with reduction of the force present between the point and socket achieved by the major support of the indicating element by buoyancy of a liquid. By so constructing the indicating element and so choosing the liquid that its effective weight is very small, frictional forces at the contact of the point and socket may be made very minute. At the same time the adoption of the arrangement just mentioned effectively reduces to a minimum any inertial forces which may be produced by shocks even when the instrument is placed on its side or inverted. In effect, the indicating element becomes approximately only a part of a liquid in which it is immersed having an effective density only very slightly greater (or less) than that liquid.

The general objects of the invention directed at the provision of a satisfactory well surveying instrument will be apparent from the foregoing. This general object and other objects relating to details of construction whereby the desired ends are achieved will become apparent from the following description read in conjunction with the accompanying drawings in which:

Figures 1A and 1B taken together show a vertical axial section through one form of well surveying instrument provided in accordance with the invention;

Figure 2 is a transverse section taken on the plane indicated at 2—2 in Figure 1B;

Figure 3 is a plan view illustrating the nature of the record made by the instrument;

Figure 4 is a fragmentary axial section showing a modified form of instrument constructed in accordance with the invention;

Figure 5 is a transverse section taken on the plane indicated at 5—5 in Figure 4;

Figure 6 is a plan view of a record produced by the instrument of Figure 4 when used at low angles of inclination; and Figure 7 is a view similar to Figure 6 but showing the records produced at larger angles of inclination.

Referring first to Figures 1A and 1B there is disclosed therein an instrument which is adapted for use through a range of relatively small inclination angles such as are commonly encountered in oil wells.

The instrument shown in these figures is that which is, in use, enclosed in a protective casing of usual type capable of withstanding pressures which may be encountered in deep holes. Such protective casings are commonly used in the art and need not be described herein. Generally speaking, the instrument which is shown is mounted in such a protective casing in alignment with the axis thereof through the medium of shock absorbing springs to minimize the possibility of damage to the sensitive parts of the instrument due to shocks which are encountered in operation.

The instrument comprises a timing clockwork indicated at 2 which may take various forms, for example, as disclosed in the application of Roland Ring, Serial No. 629,052, filed November 16, 1945, which mechanism controls a switching means, included therein, controlling the flow of current to one or more lamps supplying illumination for the photographing of the indicating element. This timing mechanism is provided with a winding knob 4 which may be set to predetermine a delay of the making of a record in the usual fashion. A cover 6 threaded to the clockwork mechanism serves to protect it from damage in handling.

Threaded to the clockwork mechanism is a tube 8 which carries internally a tubular member 10 for the reception of a suitable number of flashlight batteries 12 arranged in series. The casing of the uppermost battery engages a contact element 13 forming part of the timing mechanism and is at proper times grounded to the casing by the closure of the switch in this mechanism. The positive terminal 14 of the lowermost battery engages the upper end of a pin 16 which is pressed upwardly by a spring 18 to maintain the batteries in contact with each other and with the contact element 13 of the clockwork mechanism. This spring is received in the bore of a conductive member 20 which is carried by the interior of an insulating sleeve 22 which is housed in a tubular member 24 and threaded into this member at 26. Openings 28 in the member 24 expose the member 22 for rotation so that its lower end 30 may be moved to open or close a slot 32 through which a record member R can be inserted and removed, the member 22 being arranged to press the record member R against a seat 34 located in an insulating sleeve 33 in a tube 35. As will be evident from the drawings the arrangement of conductive and insulating members is such that an electrical connection from the battery terminal is secured through the pin 16, spring 18 and member 30 to the record member which comprises a disc of photographic paper carried by a backing disc of metal with the edges turned over the edges of the paper with the result that conduction occurs through the metal part of the record member to the conductive seat 34. This conductive path is insulated from the housing. While the member 22 should be freely rotatable by the fingers inserted through the openings 28 in the housing its free rotation under the impact of shocks is prevented by the provision of a pin 36 backed up by a spring 38, both mounted in a transverse insulating tube 39, the pin 36 bearing on the interior of the tubular member 24 to provide friction.

A metallic coupling member 43 is threaded into the lower end of the tube 35 and provides a support 42 for a centrally located lens 40 which, as will appear hereinafter, projects an image of the indicating element on the record member. A conductive ring 46, also insulated from the housing, is connected through a wire 44 to the seat 34. In the coupling member 43 there are provided insulating tubes 54 which receive pins 48 and 52 urged outwardly by springs 50 to provide electrical contacts with central contacts of lamps 56, threaded bases of which are threaded into openings in coupling member 43 to provide ground connections. It will be evident from the above that the filaments of lamps 56 are in a circuit with the batteries 12 and the switch of the timing mechanism 2 so that these filaments will be illuminated when the switch is closed.

Below the lamps there is mounted the transparent glass cover 58 of a chamber 60, the bottom of which is provided by the member 62 having a central opening across which there lies the flexible diaphragm 64 to form a bottom closure for the chamber. This flexible diaphragm is provided so that if expansion or contraction of the liquid occurs due to change of temperature there will be no tendency for the production of excessive pressure or vacuum such as would tend to cause the formation of bubbles by leakage of the transparent liquid which fills the chamber 60. Desirably this chamber is completely filled with the transparent liquid in initital assembly so that no bubbles are present tending to obscure any portions of the record. The housing 61 of the liquid chamber has threaded thereto the lower plug 68 of the housing which contains an air space 66 below the diaphragm 64. This plug contains the usual T-opening 70 by which the housing may be hooked to a bolt forming part of the shock absorbing arrangements of conventional type previously referred to and serving to support the instrument in its protective casing.

A disc 72 is clamped in the lower part of the chamber 60 and, as is more clearly indicated in Figure 2, has a centrally located spring finger 73 which mounts a jewel bearing socket 74, the member 72 being of spring type material so that a shock absorbing mounting for the jewel bearing socket is provided.

The indicating element is shown generally at 76 and comprises an inverted cup desirably of plastic material having a flat top surface on which is carried a card 78 containing markings as hereafter described. The cup is closed to provide a hollow float-type structure by a bottom element 79. A central pin 80 having a pointed lower end is arranged to be received in the socket in the jewel 74. A counterweight ring 82 is provided about the lower part of the indicating element. The bottom element 79 has mounted on its lower surface a compass needle 84.

The central part of the disc 72 and finger 73 is thickened as indicated at 85 and arranged to cooperate with this is the bevelled lower edge 83 of the ring 82 which extends below the needle 84 in the form of a skirt.

As will be seen from Figure 1B the indicating element 76 clears the cover plate 58 so that it may move angularly with respect to the axis of the instrument. The purpose of the skirt edge 83 is to minimize the possibility of damage when the instrument is turned on its side beyond the range of angles of inclination which are to be measured. When the instrument is so tilted the edge 83 bears on the enlargement 85 and acts as a fulcrum to lift the pin 80 away from the jewel socket, thus avoiding damage which may be occasioned by vibration or impact. On the other hand, the structure is such that when the instrument is restored to a position in its useful range the pin 80 will again drop into contact with the socket to position the indicating element centrally in position for proper indicating operations. The clearance between the top of the indicating element and the cover 59 is sufficiently small so that the pin can never get out of the cone of the jewel setting.

The assembly just described is so constructed with respect to the liquid in the chamber 60 in which it is immersed that its effective specific gravity is only very slightly greater than that of the liquid. Its effective center of gravity is directly below its center of buoyancy so that when the instrument is vertical the axis of the indicating element is also precisely vertical. (By effective center of gravity there is meant the apparent center of gravity with the compass needle magnetized, this being slightly different from the true center of gravity which would be the apparent one with the needle unmagnetized.)

It may be here noted that for stability in vertical position certain conditions must be attained: not only must the point of mounting be in a straight line with the effective center of gravity and the center of buoyancy, but the buoyant upward force (determined by the volume of the assembly and choice of liquid) must be such that the product of this force by the distance of the center of buoyancy from the point of support must exceed the product of the weight of the assembly by the distance of the effective center of gravity from the point of support. If the former product is less than the latter the assembly will fall over.

The liquid effects dynamic damping of oscillations of the assembly without, however, preventing the assembly from attaining a precisely vertical position. The upper surface 78 of the indicating element is provided with markings, the nature of which will be clear from Figure 3. In brief, these markings may comprise concentric circles I about the axis of the indicating element which serve for the measure of inclination and radial markings D indicative of azimuth and bearing a proper and known relation to the axis of the magnetic needle 84. Suitable numerical and lettered markings are also provided to make the record directly readable. The lower surface of the disc 58 is provided with a reference circle and cross hairs indicated at 59 which intersect in the vertical axis of the instrument, which axis is also the axis of the lens 40. While various types of markings may be used it has been found that best results are secured by providing the markings on the card 78 as white markings on a black background with the circle and cross hairs at 59 also in white. The result, accordingly, is a photographic record such as illustrated in Figure 3 involving black markings on a white background which are easily and accurately readable. In Figure 3 the turned edge of the metallic rim of the record member R is indicated at A. It may be noted that there need not necessarily be a disc-like backing for the record member but the photographic paper may instead be merely enclosed in a metallic ring which will sufficiently perform the function of conducting current as above described.

The manipulations of the instrument in making a record are substantially the same as those involved in similar instruments heretofore. A record disc is inserted in the instrument through the opening 32 and clamped in position as illustrated in Figure 1A by the turning of the member 22. The disc may be fed into the instrument from a suitable record disc holder engageable with the exterior of the instrument about the slot 32 in light-type fashion. The timing mechanism is then set for a predetermined delay and the instrument illustrated enclosed in its protective casing and lowered into a hole either on a wire line or as being dropped by a go-devil within a drill stem, the lower end of which may be provided with a non-magnetic sub so that directional readings may be made. Alternatively, the instrument may drop through the opening in the bit so as to project into a region below the bit sufficiently free of magnetic influences of the drill string and bit, the protective casing being caught by a suitable arrangement in or above the bit. After the proper time has elapsed for the making of a record the instrument is then withdrawn and the record removed and developed.

It may be noted that the invention may be carried out in a form inverted from that illustrated in Figures 1A and 1B by having the indicating element lighter than the liquid in which it is immersed so that its pin may be floated upwardly into a bearing socket. In this case, of course, the indicating element should be of slightly less specific gravity than the liquid. In common in the two cases the specific gravity of the indicating element and the liquid are approximately equal with the net result that the force between the pin and socket will be small so that a minimum frictional resistance is offered to the free attainment of a vertical and properly magnetically directed position of the indicating element. In each case the center of buoyancy should be axially above the effective center of gravity, so that, in a condition of equilibrium the two centers will be vertically aligned with the point of the pin. In both cases the approximately equal specific gravities will minimize the possibility that due to any shocks sufficient forces will be set up to do any damage to the parts.

The instrument so far described is, as will be evident, only useable through a limited range of inclination. There will now be described, with particular reference to Figure 4, a modified form of instrument embodying many of the same principles but adapted for use through a much larger range of inclination. A housing 86 has located therein a glass plate 88 on which a record member R in the form of a disc may be clamped by a member 90 similar to the member 30 heretofore described, the disc being entered into the instrument through a slot which does not appear in the figure. A support 92 for a lens 94 forms the top closure of a chamber 96 containing a transparent liquid. The lower end of this chamber is closed by a transparent glass plate 98 below which is located a lamp 102, the illumination of which may be controlled through the use of a clockwork timing mechanism such as already described but located in this case at the bottom end of the instrument. A glass or plastic insert 100 in the chamber supports in bearings 104 and 106 a spindle 108 which may be cushioned in its mounting by a spring 109. This spindle at its lower end carries a laterally extending weighted arm 110 as shown in Figure 5. At its upper end the spindle carries a fork 112 in bearings 114 in the arms of which there are mounted the trunnions 116 of a pendant member 118 which supports a jewel socket 120 for the pointed pin 122 of a transparent or translucent hemisphere 124, the surface of which carries azimuth and inclination markings. A ring 126 surrounds the lower end of this hemisphere and is magnetized to provide a directing compass. The arrangement is so weighted and formed that under equilibrium conditions the effective center of gravity and center of buoyancy of the hemisphere assembly will be vertically aligned with the point of the pin 122 which is located precisely at the center of the spherical surface carrying the markings. A flange on the pin 122 has overlying its ears 123 extending from the member 118 so that the pin has only a limited possibility of departure from the socket and cannot get to any position from which it will not normally return to seated position when the instrument is in generally upright position. The axis of the trunnions 116 passes through the center of the spherical surface, i. e., through the point of the pin when it is seated in the jewel socket. This axis is also perpendicular to the direction of lateral extent of the weighted arm 110. The center of gravity of the member 118 is directly below the axis of the trunnions so that the axis of the jewel socket is vertical.

From the foregoing it will be evident that if the arms of the fork 112 have a minimum thickness perpendicular to the plane of the section of Figure 4 there is a very considerable freedom for the indicating element 124 to remain vertical despite large angles of inclination of the instrument. When the instrument is inclined the arm 110 will turn so that it will lie toward the low side of the hole and the trunnions 116 will be horizontal. The carrier 118 will then assume a position such that the axis of the jewel is substantially vertical and the axis of the indicating element 124 will be precisely vertical as in the case of the previous modification. It is desirable that the assembly of the indicating element should have a specific gravity only slightly greater than that of the liquid in which it is immersed so that again its center of buoyancy, being directly above its effective center of gravity, its axis will, at all times, be vertical with a minimum pressure of the pin 122 on its socket and with a minimum possibility of the occurrence of destructive inertial forces. It may be noted that friction in the bearings 104, 106 and 114 will have no effect on the accuracy of the vertical of azimuthal positions attained by the indicating element 124. Friction forces at these bearings may prevent the parts, other than the indicating element, from assuming precisely their theoretical positions; but even if they depart from these the pin 122 may assume a vertical position and will be rotated to an accurate azimuthal position due to the minimum of friction of the pin in its socket.

The markings which may be carried by the indicating element 124 will be clear from Figures 6 and 7 which show records made respectively at low and high angles of inclination. These markings are, in effect, latitude and longitude markings on the surface of the hemisphere 124, with a polar axis marking at 130. Concentric circles indicated at 128 are provided on the upper surface of the glass disc 88 to provide a reference for reading small angles of inclination. The images of these markings are indicated at 128 in Figures 6 and 7. Illumination of the parts is effected in this case by transmitted light from the bulb 102 projected through the lower cover disc 98 and the transparent bearing support 100 and also through the transparent or translucent hemisphere 124. In order to get a clear showing of the markings at 128 it is desirable that these should be opaque and that the markings on the hemisphere should be in black on a white background. In such case, of course, the actual records will be the negatives of those illustrated in Figures 6 and 7 unless a reversal process is used in development of the record. Small angles of inclination may be most readily determined by the position on the record of the axis marking 130 on the hemisphere with reference to the circles 128. On the other hand, under conditions of large angles of inclination the latitude lines on the hemisphere may be read against the center of the circles 128. It will be obvious that other systems of marking may be used.

What is claimed is:

1. An inclination and direction indicator comprising a chamber, liquid in the chamber, an indicating element immersed in liquid in the chamber, a supporting element in the chamber, one of said elements including a pointed pin and the other of said elements providing a socket for the reception of said pin, said indicating element including a magnetized compass member and having markings thereon in correspondence with said compass member, the center of buoyancy of said indicating element being above its effective center of gravity when the pin is seated in the socket and both the center of buoyancy and the effective center of gravity lying on the same side of the point of contact of the pin and socket, with said centers vertically aligned with the point of said pin when the indicator is in equilibrium, the specific gravity of said indicating element approximating, but being slightly different from, the specific gravity of said liquid to provide a small net force effecting seating between the pin and socket, and interengaging means provided by said indicating and supporting elements for unseating the pin and socket when the chamber is inclined beyond a working range of the indicator.

2. An inclination and direction indicator comprising a chamber, liquid in the chamber, an indicating element immersed in liquid in the chamber, said indicating element comprising a buoyant drum shaped member having a flat end surface, a counterweight ring attached to the lower portion of said drum shaped member, a magnetized compass member attached to the lower portion of said drum shaped member and a compass card mounted on the flat end surface and having markings thereon in correspondence with said compass member, a resiliently mounted supporting element in said chamber, one of said elements including a pointed pin and the other of said elements providing a socket for the reception of said pin, the center of buoyancy of said indicating element being above its effective center of gravity when the pin is seated in the socket and both the center of buoyancy and the effective center of gravity lying on the same side of the point of contact of the pin and socket, with said centers vertically aligned with the point of said pin when the indicator is in equilibrium, the specific gravity of said indicating element approximating, but being slightly different from, the specific gravity of said liquid to provide a small net force effecting seating between the pin and socket, and interengaging means provided by said indicating and supporting elements for unseating the pin and socket when the chamber is inclined beyond a working range of the indicator.

3. An inclination and direction indicator comprising a chamber, liquid in the chamber, an indicating element immersed in liquid in the chamber, said indicating element comprising a member semispherical in shape, a magnetized compass member attached to the lower portion of said semispherical member, markings on the top of said semispherical member in correspondence with said compass member, a resiliently mounted supporting element in said chamber and weighted pivoted means for maintaining said supporting element in a predetermined position with respect to the vertical and with respect to the axis of inclination of said chamber, one of said elements including a pointed pin and the other of said elements providing a socket for the reception of said pin, the center of buoyancy of said indicating element being above its effective center of gravity when the pin it seated in the socket and both the center of buoyancy and the effective center of gravity lying on the same side of the point of contact of the pin and socket, with said centers vertically aligned with the point of said pin when the indicator is in equilibrium, the specific gravity of said indicating element approximating, but being slightly different from, the specific gravity of said liquid to provide a small net force effecting seating between the pin and socket, and interengaging means provided by said indicating and supporting elements for unseating the pin and socket when the chamber is inclined beyond a working range of the indicator.

EINAR T. YOUNG.

REFERENCES CITED

The following references are of record in the file of this patent:

UNITED STATES PATENTS

| Number | Name | Date |
|---|---|---|
| 1,376,727 | Pentz | May 3, 1921 |
| 1,424,804 | Day | Aug. 8, 1922 |
| 1,679,764 | Colvin | Aug. 7, 1928 |
| 2,008,481 | Weber | July 16, 1935 |
| 2,041,072 | Kollsman | May 19, 1936 |
| 2,056,715 | Dinsmore | Oct. 6, 1936 |
| 2,124,892 | Nichols | July 26, 1938 |
| 2,215,622 | Sperry | Sept. 24, 1940 |
| 2,313,168 | Opocensky | Mar. 9, 1943 |
| 2,364,908 | Miller | Dec. 12, 1944 |
| 2,428,346 | White | Sept. 30, 1947 |

FOREIGN PATENTS

| Number | Country | Date |
|---|---|---|
| 3,644 | Great Britain | 1813 |
| 117,161 | Great Britain | 1918 |